US008218701B2

(12) United States Patent
Takahashi

(10) Patent No.: US 8,218,701 B2
(45) Date of Patent: Jul. 10, 2012

(54) COMMUNICATION SYSTEM

(75) Inventor: Tsugio Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1097 days.

(21) Appl. No.: 12/050,310

(22) Filed: Mar. 18, 2008

(65) Prior Publication Data
US 2008/0232529 A1 Sep. 25, 2008

(30) Foreign Application Priority Data

Mar. 19, 2007 (JP) ................................. 2007-070775

(51) Int. Cl.
*H04L 7/00* (2006.01)
*H04L 7/08* (2006.01)
*H04J 3/06* (2006.01)
(52) U.S. Cl. .................. 375/354; 375/368; 370/514
(58) Field of Classification Search .................. 375/259, 375/295, 316, 354–355, 362–368; 398/140, 398/154; 370/503, 509–514
See application file for complete search history.

(56) References Cited

U.S. PATENT DOCUMENTS

| 4,686,690 | A | * | 8/1987 | Sato | 375/365 |
| 5,228,036 | A | * | 7/1993 | Okamoto et al. | 370/514 |
| 5,267,267 | A | * | 11/1993 | Kazawa et al. | 375/294 |
| 5,402,448 | A | * | 3/1995 | Marko et al. | 375/340 |
| 5,572,496 | A | * | 11/1996 | Hayashi et al. | 369/59.18 |
| 5,646,758 | A | * | 7/1997 | Miki et al. | 398/100 |
| 5,963,605 | A | * | 10/1999 | Yasui | 375/368 |
| 6,011,807 | A | * | 1/2000 | Castagna et al. | 370/506 |
| 6,693,919 | B1 | * | 2/2004 | Kameyama | 370/503 |
| 2001/0008550 | A1 | * | 7/2001 | Takahashi | 375/368 |

FOREIGN PATENT DOCUMENTS

JP 2004112123 A 4/2004

OTHER PUBLICATIONS

Sauter et al., Majority Manchester Decoding for Active Redundant Data Transmission, 1995, Computers and Communications, 1995. Proceeings., IEEE Symposium on, pp. 78-82.*

* cited by examiner

*Primary Examiner* — Lawrence B Williams

(57) ABSTRACT

A frame synchronization device and a frame synchronization method capable of preventing a malfunction when a frame is synchronized by using a frame synchronization pattern varying sequentially is presented. A bit serial signal at every frame is transmitted sequentially in a shift register composed of flip-flop circuits. When a bit in each of the stages is detected to be coincided with a corresponding bit in a frame synchronization pattern by coincidence circuits, existence of a synchronized frame is determined. Each bit in the synchronization pattern is also inputted into an all-zero detection circuit. If an all-zero state is detected, a first AND circuit does not output a synchronization pattern detecting signal even with a case where coincidence is detected from the coincidence circuits.

3 Claims, 8 Drawing Sheets

COMMUNICATION SYSTEM

CROSS-REFERENCE TO RELATED APPLICATION

This application is based upon and claims the benefit of priority from Japanese patent application No. 2007-070775, filed on Mar. 19, 2007, the disclosure of which is incorporated herein in its entirety by reference.

BACKGROUND OF THE INVENTION

1. Field of the Invention

The present invention relates to a communication system for performing communication by synchronizing framed incoming data.

2. Description of the Related Art

An SDH (Synchronous Digital Hierarchy) technology being a net synchronization system to supply a synchronous clock in a network required for multiplexing has been standardized by ITU-T (International Telecommunication Union-Telecommunication), based on a SONET (Synchronous Optical Network) technology developed in the United States as high-speed transmission technology using optical fibers. An SDH signal to be sent or received in a transmission system using the SDH technology is to be frame-structured. In the frame-structured SDH signal, a fixed frame synchronization pattern is arranged at a specific position of a frame on a sending end, and the frame synchronization pattern is recognized on a receiving end to perform a synchronous detection of a frame, so that a frame phase is exactly recognized, and a signal in a predetermined format is sent and received.

Here, a receiving end device receives an optical signal and processes it as an electrical signal. However, in a communication system in which a high-speed optical signal, such as at 40 Gb/s, is transmitted via an optical fiber, it is difficult for the receiving end device to process the optical signal electrically at this speed. Therefore, in such a communication system, a high-speed signal is converted into a lower speed parallel signal to be processed electrically (refer to, for example, Japanese Patent Application Laid-open No. 2004-112123).

FIG. 8 shows one example of such communication systems. A transmitting device 101 and a receiving device 102 composing a communication system 100 are connected with an optical fiber 103. An optical signal 104 is sent at 40 Gb/s from the transmitting device 101 to the receiving device 102 through the optical fiber 103.

At the receiving device 102, a receiving side optical module 111 converts the optical signal 104 into an electric signal, and sends it to a signal processing unit 114 as a parallel data 113 composed of a zeroth to fifteenth signals $112_0$-$112_{15}$. At that time, a deskew signal 115 is generated in the receiving side optical module 111 for synchronizing each of the zeroth to fifteenth signals $112_0$-$112_{15}$ in frames. The deskew signal 115 is a signal for correcting a phase shift of the parallel data 113, and extracted partially from each signal received by the receiving side optical module 111. The deskew signal 115 is sent to the signal processing unit 114.

At the signal processing unit 114, the zeroth to fifteenth signals $112_0$-$112_{15}$ received are compared in frames with a frame synchronization pattern which is determined according to the deskew signal 115. Further, even if the patterns coincide, the synchronization is not established immediately. The synchronization is not established until a coincidence of the patterns is detected continuously in a plurality of frames. In this case, the synchronization is established when the coincidences are detected in continuous "a" number of frames ("a" is 2 or a larger positive integer). It is expressed as "a synchronization establishment protection stage count is "a" stages". For example, when the synchronization establishment protection stage count is assumed to be 2 stages, it means that, in the fifteenth signal $112_{15}$, as an example, the frame synchronization patterns coincide in sequential two frames.

In the communication system 100 shown in FIG. 8, an early stage immediately after the transmitting device 101 is powered or the receiving side optical module 111 in the receiving device 102 is powered, is considered. The system is not stable in such a stage. In such an unstable stage, as a bit length composing the frame synchronization pattern, a bit string having at least an all-zero or all-one is more likely to be generated, as zeroth to fifteenth signals $112_0$-$112_{15}$. The same problem also occurs when there is a failure such that the optical signal 104 is not sent to the receiving device 102 temporarily because of the disconnection of the optical fiber 103.

If the signal processing unit 114 monitors whether there is a coincidence of the patterns or not by varying the frame synchronization pattern in frames according to the deskew signal 115, the frame synchronization pattern is more likely to be the aforementioned all-zero state in a condition where the system is not yet started up normally. Further, in such a condition, the all-zero bits is more likely to continue in the frames of the zeroth to fifteenth signals $112_0$-$112_{15}$. Accordingly, a synchronization of frames is more likely to be detected wrongly in such a case.

Once the frame synchronization is detected wrongly, as in a same manner with a state shifting from non-synchronization state to synchronization establishment state as described above, the protection stage count is generally set also in a state shifting from the synchronization establishment state to the non-synchronization state. A non-synchronization protection stage count is assumed to be "b" stages ("b" is 2 or a larger positive integer). For example, when the non-synchronization protection stage count is assumed to be three stages, it means that the frame synchronization pattern does not coincide in sequential three frames of the fifteenth signal $112_{15}$.

Once an unillustrated frame synchronization device in the signal processing unit 114 in FIG. 8 is in an erroneous synchronization state, (b+a) number of frames, which is summation of "b" stages of the non-synchronization protection stage count and "a" stages of the synchronization establishment stage count thereafter, are required to be received by the receiving device 102 from receipt of a normal frame synchronization pattern to completion of normal synchronization pull-in. That is, the frame synchronization is wrongly detected in some cases when a system is in an abnormal state, and in such a case, there is a problem in which it takes comparably long time for the system to be recovered from a line disconnection status to a normal status. This is a serious failure for a device, such as a SONET/SDH device, in which particularly high-quality is required for a line.

Performance degradation in the SONET/SDH device has been explained hereinbefore. Generally, there is the same problem also in a frame synchronization device and a frame synchronization method which synchronizes a frame by using a frame synchronization pattern extracted partially from a signal sent by a transmitting end.

SUMMARY OF THE INVENTION

An exemplary object of the present invention is to provide a communication system capable of preventing a malfunction when frames are synchronized by using a frame synchronization pattern varying continuously.

To achieve the above object, the communication system, according to the exemplary aspect of the invention, in which a transmitting device sends a frame-structured signal to a receiving device and the receiving device recognizes a frame synchronization pattern and detects a synchronized frame, so as to establish synchronization, wherein the receiving device has a frame synchronization device for establishing the synchronization by comparing a frame synchronization pattern for synchronous detection, which is determined according to a correction signal for correcting a phase shift, and the signal in frames, and the frame synchronization device prevents establishing the synchronization during a period in which a frame synchronization pattern for preventing a synchronization establishment state and a frame pattern of the signal are coincident with each other.

A control device, according to another exemplary aspect of the invention, receiving a frame-structured signal sent from the transmitting device and recognizes a frame synchronization pattern to perform a synchronous detection of a frame, so as to control synchronization establishment, the control device includes:

a frame synchronization device for establishing the synchronization by comparing a frame synchronization pattern which is determined according to a correction signal for correcting a phase shift and the signal in frames; wherein the frame synchronization device prevents establishing the synchronization during a period in which a frame synchronization pattern for preventing a synchronization establishment state and a frame pattern of the signal are coincident with each other.

A communication method, according to still another exemplary aspect of the present invention, with which a transmitting device sends a frame-structured signal to a receiving device and the receiving device recognizes a frame synchronization pattern to perform a synchronous detection of a frame, so as to establish synchronization, the method comprising the steps of:

establishing the synchronization by comparing a frame synchronization pattern for synchronous detection, which is determined according to a correction signal for correcting a phase shift, and the signal in frames; and preventing establishing synchronization in a period in which a frame synchronization pattern for preventing a synchronization establishment state and a frame pattern of the signal are coincident with each other.

As an exemplary advantage according to the invention, even with a system receiving frame synchronization patterns randomly and sequentially to synchronize frames, a determination of a frame synchronization can be prohibited upon receiving a frame synchronization pattern which is not suitable or is likely to be generated in an unstable system from synchronizing a frame. Therefore, the malfunction in a synchronization processing within the receiving device can be effectively prevented because it works effectively for a failure occurred at a transmission path, a relay device, or the like, which cannot be dealt by the transmitting device.

DESCRIPTION OF EXEMPLARY EMBODIMENTS

Hereinafter, an exemplary embodiment of the invention will be explained in detail with reference to drawings.

First Exemplary Embodiment

Figure 1:
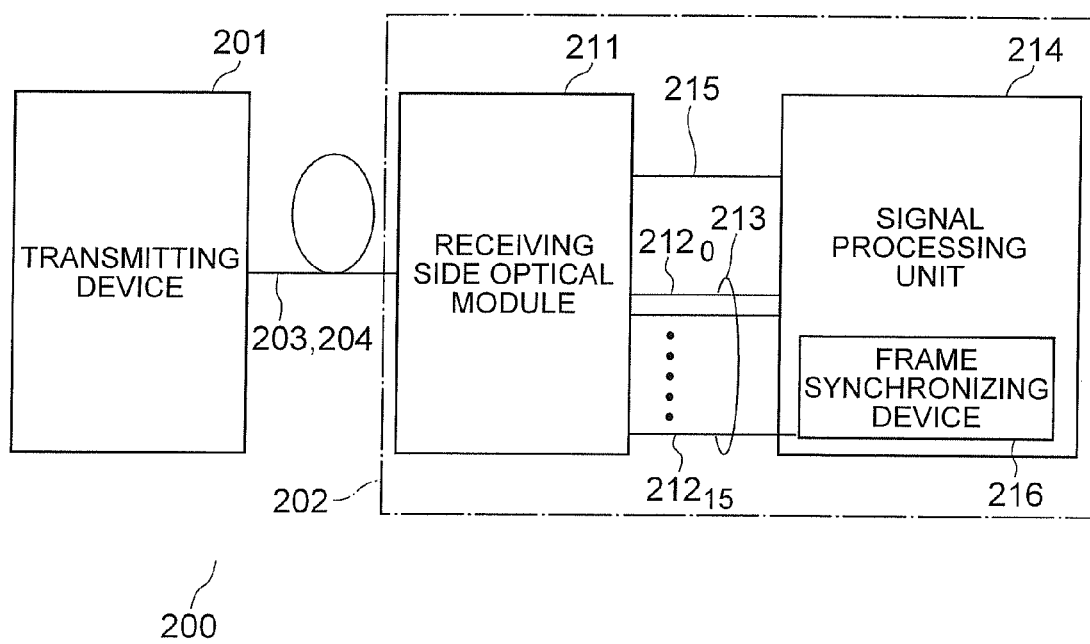
FIG. 1 is a configuration diagram showing an example of a frame synchronization device according to a first exemplary embodiment of the invention applied to a communication system.

FIG. 1 shows an example of a communication system including a frame synchronization device according to an exemplary embodiment of the invention. A communication system 200 shown in FIG. 1 includes a transmitting device 201 and a receiving device 202, wherein the transmitting device 201 and the receiving device 202 are connected by an optical fiber 203. A signal 204 is sent from the transmitting device 201 to the receiving device 202 using the optical fiber 203 at a communication speed of, for example, 40 Gb/s.

Figure 8:
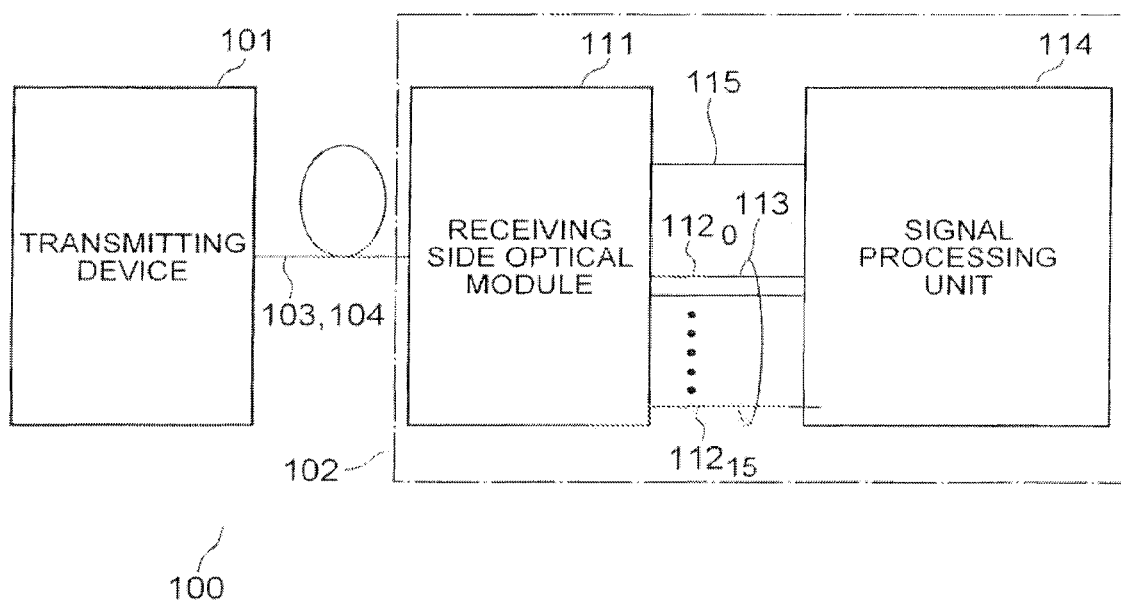
FIG. 8 is a system configuration diagram showing an example of a communication system in a related art.

In the receiving device 202, the receiving side optical module 211 converts the optical signal 204 into an electric signal, and sends it to the signal processing unit 214 as a parallel data 213 composed of a zeroth to fifteenth signals $212_0$-$212_{15}$ corresponding to a zeroth to fifteenth channel. At that time, a deskew signal 215 is generated in the receiving side optical module 211 for synchronizing each of the zeroth to fifteenth signals $212_0$-$212_{15}$ in frames. This deskew signal 215 is a correction signal for correcting a phase shift of the parallel data 213, extracted partially from each signal received by the receiving side optical module 211. The deskew signal 215 is sent to the signal processing unit 214. A structure of the transmitting device 201 and the receiving side optical module 211 in the receiving device 202 may be the same as the structure of the transmitting device 101 and the receiving side optical module 111 in the receiving device 102 shown in FIG. 8.

In the frame synchronization device 216 in the signal processing unit 214, the zeroth to fifteenth signals $212_0$-$212_{15}$ received are compared in frames with a frame synchronization pattern which is determined according to the deskew signal 215. Further, even if the patterns coincide, the synchronization is not established immediately. The synchronization is not established until a coincidence of the patterns is detected continuously in a plurality of frames. According to this exemplary embodiment, "a" stages, which is a synchronization establishment protection stage count, is two stages. Also, "b" stages, which is a non-synchronization protection stage count, is three stages.

Figure 2:
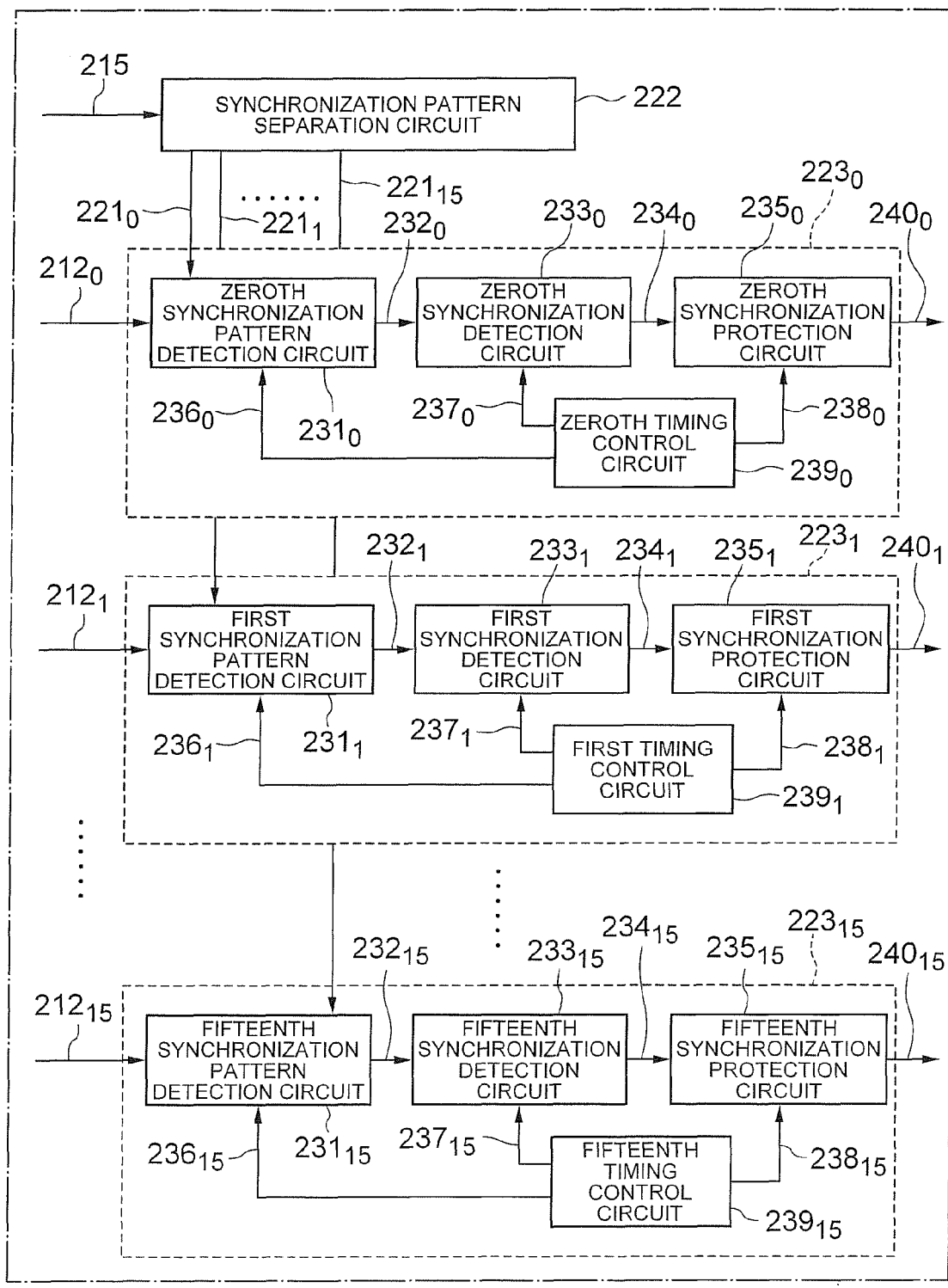
FIG. 2 is a block diagram showing a specific example of the frame synchronization device according to a first exemplary embodiment of the invention.

FIG. 2 shows a structure of the frame synchronization device. The frame synchronization device 216 includes a synchronization pattern separation circuit 222 for inputting the deskew signal 215 and outputting the zeroth to fifteenth synchronization patterns $221_0$-$221_{15}$ corresponding to the zeroth to fifteenth channels, and synchronization processing units $223_0$-$223_{15}$ for inputting signals corresponding the zeroth to fifteenth signals $212_0$-$212_{15}$ respectively to perform the synchronization establishment.

A zeroth synchronization processing unit $223_0$ is composed of a zeroth synchronization pattern detection circuit $231_0$ for detecting the zeroth synchronization pattern $221_0$ with respect to a frame of the zeroth signal $212_0$, a zeroth synchronization detection circuit $233_0$ for inputting the zeroth synchronization pattern detecting signal $232_0$, which is going to be outputted, so as to determine whether a pattern suitable for the synchronization is detected or not, a zeroth synchronization protection circuit $235_0$ for inputting the zeroth synchronization detecting signal $234_0$, which is going to be outputted, a zeroth timing control circuit $239_0$ for providing the above three circuit $231_0$, $233_0$, $235_0$ with clocks $236_0$, $237_0$, $238_0$, to control timing. The zeroth synchronization protection circuit $235_0$ outputs a zeroth synchronization establishment signal $240_0$ to show the synchronization is established.

A first to fifteenth synchronization processing units $223_1$-$223_{15}$ have the same structure with the zeroth synchronization processing unit $223_0$. Therefore, components of the first to fifteenth synchronization processing units $223_1$-$223_{15}$ have each component code with subscripts "1"-"15" which are changed from "0" of the corresponding component of the zeroth synchronization processing unit $223_0$. Those functions are also the same as the zeroth synchronization processing unit $223_0$.

Figure 3:
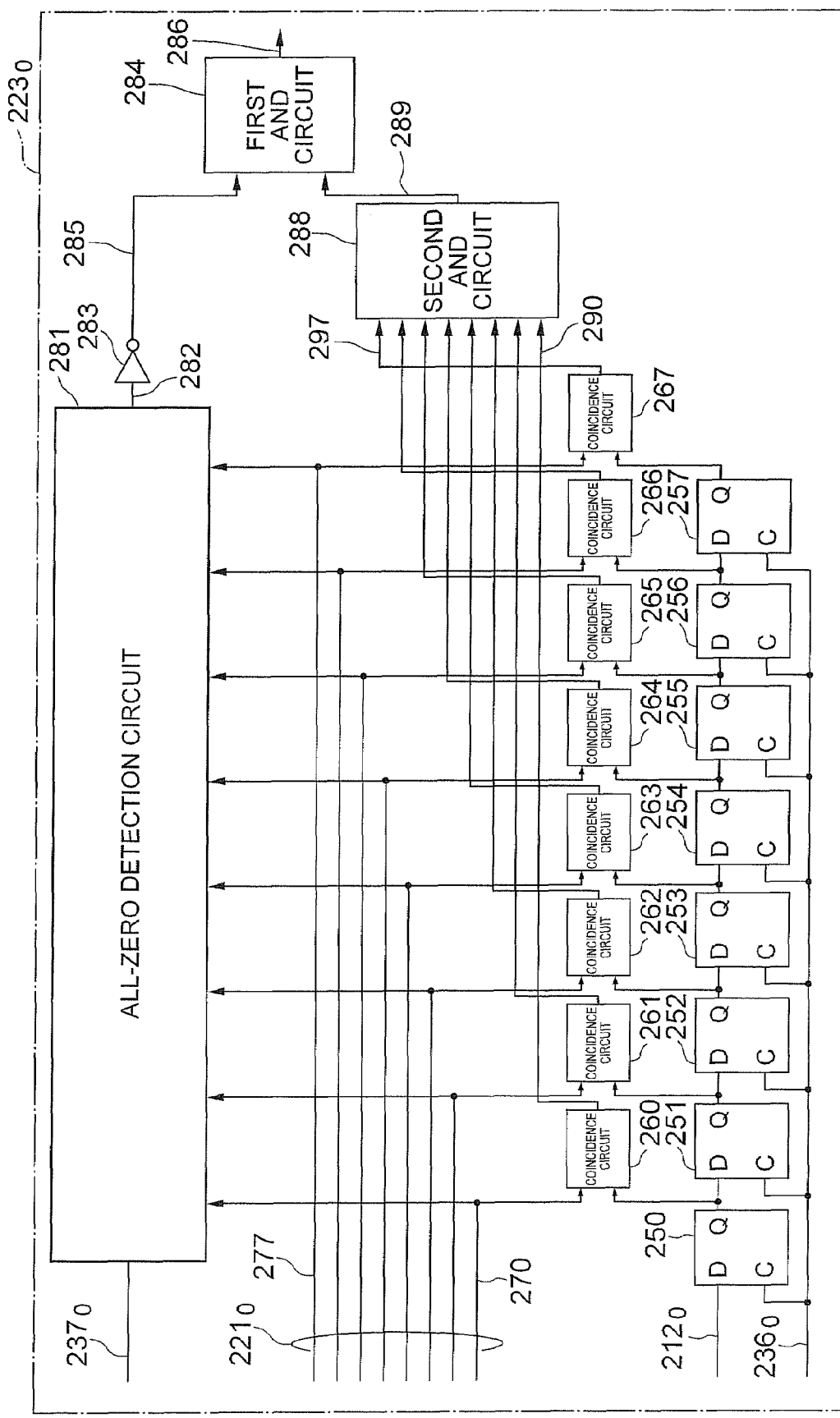
FIG. 3 is a block diagram showing a specific example of a zeroth synchronization processing unit in the frame synchronization device according to a first exemplary embodiment of the invention.

FIG. 3 shows a main part of the zeroth synchronization processing unit $223_0$ in FIG. 2 specifically. The zeroth synchronization processing unit $223_0$ includes a shift register composed of a zeroth to seventh flip-flop circuits 250-257 for synchronizing the zeroth signal $212_0$ with the clock $236_0$ so as to shift it sequentially, a zeroth to seventh coincidence circuits 260-267 for inputting an output from each output terminal Q of the zeroth to seventh flip-flop circuits 250-257 into one of those input terminals for comparison.

The zeroth synchronization pattern $221_0$ is composed of a zeroth to seventh synchronization bits 270-277, i.e. 8 bits in total, provided from the synchronization pattern separation circuit 222 shown in FIG. 2. Each one of zeroth to seventh synchronization bits 270-277 is inputted into the other input terminal for comparison of a corresponding coincidence circuit among the zeroth to seventh coincidence circuits 260-267, and also inputted into an all-zero detection circuit 281 composing a portion of the zeroth synchronization detection circuit $233_0$ (FIG. 2).

The all-zero detection circuit 281 detects a condition where the entire 8 bits of the zeroth to seventh synchronization bits 270-277, which are inputted in parallel, are being signals "0". The all-zero detection circuit 281 can be composed of eight inverters for inverting a logic of each input, and an eight-input AND circuit inputting outputs of those inverters. Only when all of the zeroth to seventh synchronization bits 270 to 277 become the signal "0", the all-zero detection circuit 281 outputs an all-zero detecting signal 282 which is to be a signal "1".

The all-zero detecting signal 282 is inputted into an inverter 283 in the input side of a first AND circuit 284 which is composed of a portion of the zero synchronization detection circuit $233_0$ (FIG. 2), and its logic is inverted. Therefore, an output 285 of the inverter 283 is to be the signal "0" only with a condition where all of the zero to seventh synchronization bits 270-277 are being the signals "0". The output 285 is one of two inputs of the first AND circuit 284. Consequently, when all of the zero to seventh synchronization bits 270-277 become the signals "0", the first AND circuit 284 outputs the signals "0" indicating an asynchronous state as a synchronization pattern detecting signal 286 regardless of a logic state at the other input terminal.

Meanwhile, each of the zeroth to seventh coincidence circuits 260-267 is composed of a comparator. The comparators can be composed of, for example, a two-input EOR (Exclusive OR) circuit and an inverter for logic inversion disposed in an output side of the two input EOR circuit. Accordingly, the zeroth to seventh coincidence circuits 260-267 output coincidence result signals 290-297 which are to be the signal "1", only when two inputs are in the same logic state. These coincidence result signals 290-297 are inputted into a second AND circuit 288. The second AND circuit 288 is an eight-input AND circuit. Accordingly, it outputs a pre-prohibition synchronization pattern detecting signal 289 which is to be the signal "1" only when all of the coincidence result signals 290-297 are being the signals "1" at the same time. The pre-prohibition synchronization pattern detecting signal 289 is to be the other input of the two inputs of the first AND circuit 284.

Therefore, the second AND circuit 288 detects a bit string with 8 bits coincided with the zeroth synchronization pattern $221_0$, if it exists, in a condition where one frame of the zeroth signal $212_0$ is shifted from the zeroth to seventh flip-flop circuits 250-257 sequentially by 1 bit according to the clock $236_0$. If the zeroth synchronization pattern $221_0$ is composed of such as a bit string, "10111010", and the same bit string is in the zeroth signal $212_0$ composing a frame, the second AND circuit 288 outputs a pre-prohibition synchronization pattern detecting signal 289 to be the signal "1" at the detecting timing. In this example, the all-zero detection circuit 281 does not detect the all-zero state because the zeroth synchronization pattern $221_0$ is not with all "0". Therefore, the all-zero detecting signal 282 is the signal "0", and the output 285 of the inverter 283 is the signal "1". Accordingly, both of two inputs into the first AND circuit 284 are to be the signals "1", and the synchronization pattern detecting signal 286 becomes the signal "1". Thus, an existence of the frame synchronization pattern in a corresponding frame is detected.

On the other hand, when the zeroth synchronization pattern $221_0$ is composed of such as an all-zero bit string, "00000000", the all-zero detecting signal 282 becomes the signal "1". Therefore, when the zeroth synchronization pattern $211_0$ has the all-zero bit string such as "00000000", the pre-prohibition synchronization pattern detecting signal 289 of the second AND circuit 288 becomes "1", and the output 285 of the inverter 283 is inverted into "0". Accordingly, the synchronization pattern detecting signal 286 as an output of the first AND circuit 284 becomes the signal "0" indicating the asynchronous state, thus the synchronization is not detected.

Figure 4:
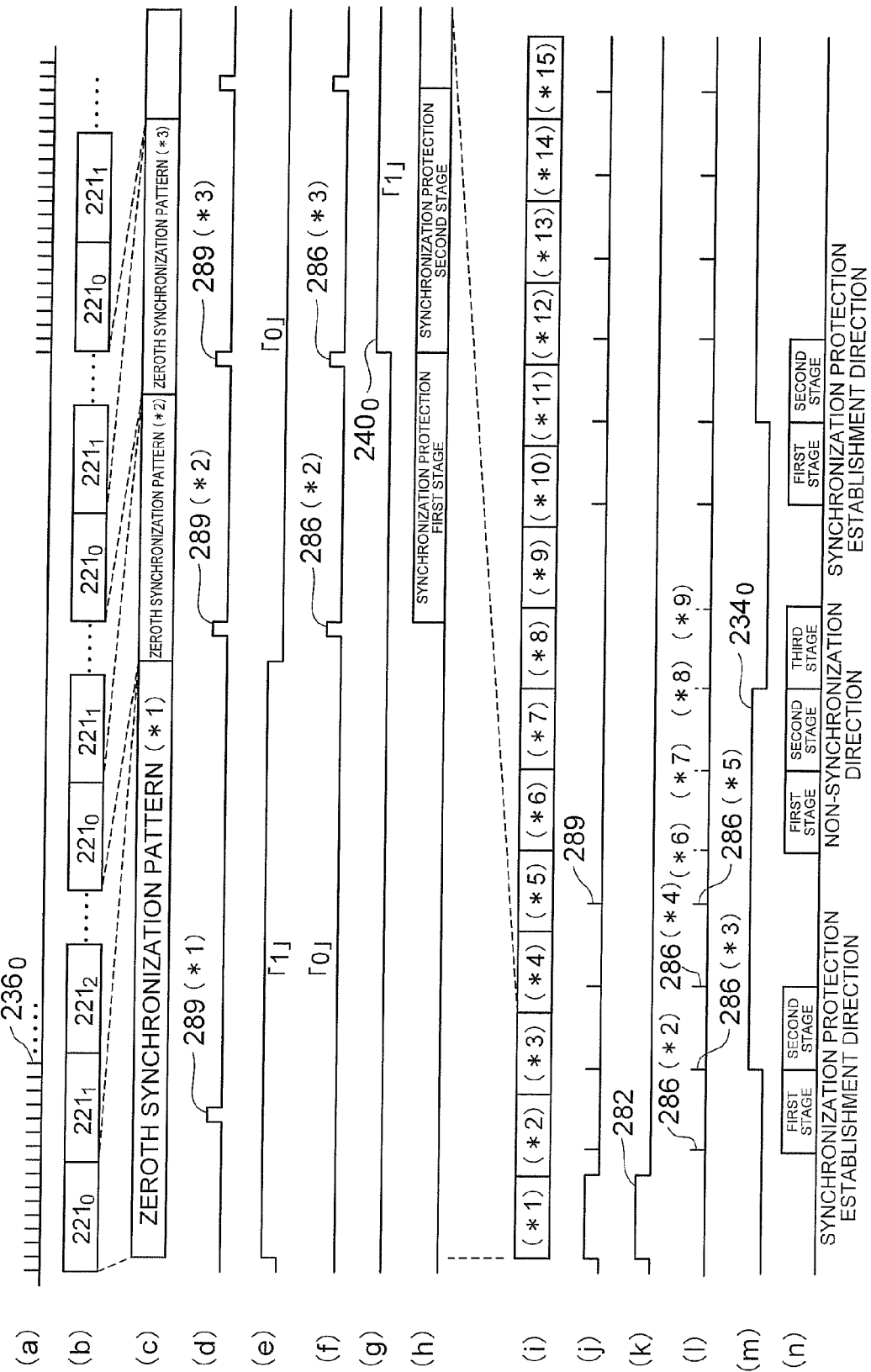
FIG. 4 is a timing diagram explaining control of frame synchronization in a first exemplary embodiment of the invention.

FIG. 4 is for explaining control of frame synchronization in the receiving device having the above structure. Hereinafter, details will be described focusing on the zeroth synchronization processing unit $223_0$ shown in FIG. 3. In this case, the synchronization establishment protection step count "a" is two stages. In addition, a horizontal axis of FIG. 4 shows a time axis, and a scale of the time axis varies from place to place for convenience of explanation.

FIG. 4(a) shows a clock $236_0$ outputted from the zeroth timing control circuit $239_0$ shown in FIG. 2. FIG. 4(b) shows the zeroth to the fifteenth synchronization patterns $221_0$-$221_{15}$ shown in FIG. 2. These show that the deskew signal 215 is synchronized with the clock $236_0$, and is divided at every eight bits to generate the synchronization patterns $221_0$-$221_{15}$.

FIG. 4(c) shows that the zeroth synchronization pattern detection circuit $231_0$ shown in FIG. 2 holds the zeroth synchronization pattern $221_0$ in frames sequentially. Each frame has an equivalent time length, however, in this figure, a first zeroth synchronization pattern $221_0$ shown with "*1" is in a more enlarged time length than other frames, for convenience of explanation. The first zeroth synchronization pattern $221_0$ (*1) shown with "*1" is assumed to be an all-zero frame synchronization pattern, and following other zeroth synchronization patterns $221_0$(*2), $221_0$(*3), etc. are assumed not to be the all-zero frame synchronization pattern.

FIG. 4(d) shows one example of timings for the second AND circuit 288 shown in FIG. 3 to output the pre-prohibition synchronization pattern detecting signal 289. One frame of the zeroth signal $212_0$(*1) shown in FIG. 3 is assumed to have a series of the signals "0", at least eight bits or more. When it is detected, the pre-prohibition synchronization pattern detecting signal 289(*1) becomes the signal "1". When the following signals such as the zeroth signals $212_0$(*2), $212_0$(*3), etc. in other frames are coincident with the zeroth synchronization patterns $221_0$(*2), $221_0$(*3), etc., the following pre-prohibition synchronization pattern detecting signal 289 such as a pre-prohibition synchronization pattern detecting signals 289(*2), 289(*3), etc. become the signals "1" as in the same manner when each coincidence is detected.

FIG. 4(e) shows a logic state of the all-zero detecting signal 282 outputted from the all-zero detection circuit 281 shown in FIG. 3. The all-zero detection circuit 281 detects the all-zero state from the first zeroth synchronization pattern $221_0$(*1) in FIG. 4(c), so that the all-zero detecting signal 282 becomes the signal "1" for this one frame. Meanwhile, the all-zero is not detected from the following zeroth synchronization patterns $221_0$(*2), $221_0$(*3), etc. Therefore, the all-zero detecting signals 282 become "0" for those frames.

FIG. 4(f) shows an output condition of the first AND circuit 284. In the zeroth synchronization pattern $221_0$(*1) from which the all-zero is detected, the output signal 285 of the inverter 283 shown in FIG. 3 is the signal "0". Therefore, the synchronization pattern detecting signal 286 outputted from the first AND circuit is still the signal "0" for this frame. For the following frames, the synchronization pattern detecting signals 286(*2), 286(*3), etc. being the signals "1" are outputted respectively with respect to the zeroth synchronization patterns $221_0$(*2), $221_0$(*3), etc.

FIG. 4(g) shows an operation of the zeroth synchronization protection circuit $235_0$ shown in FIG. 2. With the synchronization pattern detecting signal 286(*2) shown in FIG. 4(f), a right frame synchronization pattern in a first stage is detected, and sequentially, with the synchronization pattern detecting signal 286(*3), a right frame synchronization pattern in a second stage is detected. Therefore, the zeroth synchronization protection circuit $235_0$ establishes the synchronization at timing when the right frame synchronization pattern in the second stage is detected. Consequently, the zeroth synchronization establishment signal $240_0$ becomes the signal "1" at this point. FIG. 4(h) shows that the zeroth synchronization establishment signal $240_0$ changes into "1" at the synchronization protection in the second stage.

FIG. 4(i) shows the zeroth synchronization patterns $221_0$ of each frame shown in FIG. 4(c) with the time axis compressed to observe synchronization protection establishment state and the non-synchronization state in a comparably long term. In this figure, variations of each frame of zeroth synchronization patterns $221_0$ are expressed with an asterisk by (*1), (*2), etc.

FIG. 4(j) corresponds to FIG. 4(d), showing timing for the second AND circuit 288 shown in FIG. 3 to output the pre-prohibition synchronization patter detecting signal 289. Further, FIG. 4(k) corresponds to FIG. 4(e), showing the all-zero detecting signal 282 outputted from the all-zero detection circuit 281 shown in FIG. 3. When the pre-prohibition synchronization pattern detecting signal 289 and the all-zero detecting signal 282 are generated as shown in the figures, the first AND circuit 284 shown in FIG. 3 outputs the synchronization pattern detecting signal 286 as shown in FIG. 4(l).

In this case, the zeroth synchronization detecting signal $234_0$ in FIG. 2 is to be one shown in FIG. 4(m). That is, the zeroth synchronization detecting signal $234_0$ changes into the signal "1" according to a second synchronization pattern detecting signal 286(*3) in FIG. 4(l) after a period where the all-zero detecting signal 282 in FIG. 4(k) prohibits the synchronization establishment. Thus, the synchronization is established.

FIG. 4(n) shows each number of stages for a synchronization protection direction and a non-synchronization direction. A first zeroth synchronization detecting signal $234_0$ shown in FIG. 4(m) changes into the signal "1" and the synchronization is established when the operation progresses in the synchronization protection establishment direction and the synchronization protection clears the second stage.

Next, non-synchronization control after the synchronization is established is considered. In this exemplary embodiment, as for the non-synchronization direction, the non-synchronization is determined when a third stage is cleared as described, that is the frame synchronization is not established three times continuously. A detection result according to the all-zero detecting signal 282 is ignored also in this case. In FIG. 4(l), the non-synchronization is established when the non-synchronization is generated three times (in three stages) continuously under a situation where the all-zero detecting signal 282 is not generated ((*6)-(*9)) after the synchronization establishment. If the all-zero is detected by the all-zero detecting circuit 281 in this process, the non-synchronization is postponed its establishment while the detection.

As described above, according to this exemplary embodiment, the all-zero pattern which is likely to appear when a system does not work normally, such as at a system start-up, is prepared in advance, and when this pattern is coincided with a bit string in a frame, the synchronization is prohibited from being pulled in. Therefore, the synchronization pull-in can be started immediately with respect to a normal synchronization pattern, and a start-up time for a system can be minimized.

Second Exemplary Embodiment

Figure 5:
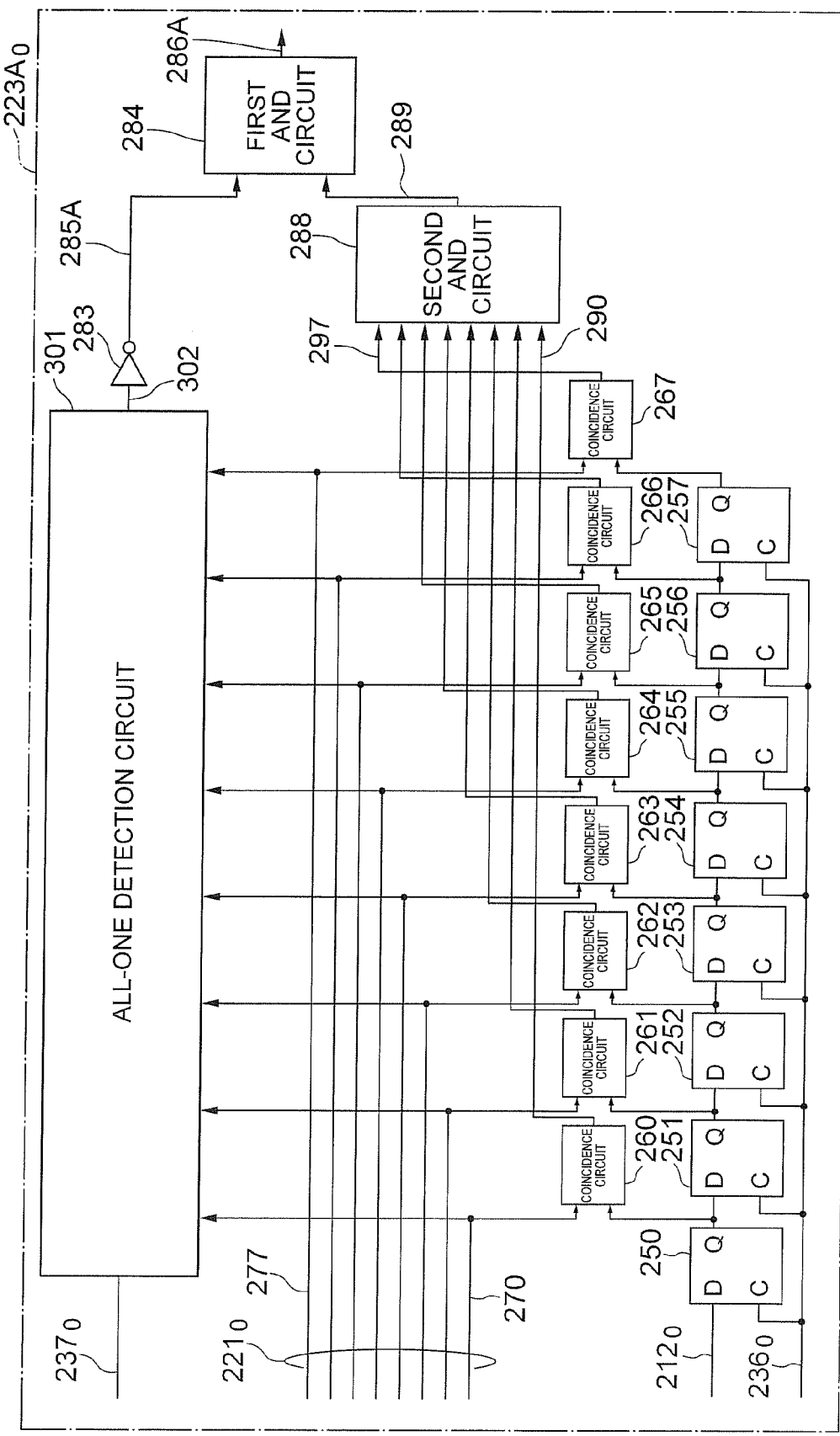
FIG. 5 is a block diagram showing a specific example of a zeroth synchronization processing unit in a second exemplary embodiment of the invention.

Next, a second exemplary embodiment will be explained with reference to FIG. 5, which is a modified example of the structure of the zeroth synchronization processing unit in the first exemplary embodiment of the invention shown in FIG. 3. Identical portions between FIGS. 3 and 5 have the same reference numerals, and explanations therefor will be omitted accordingly.

The zeroth synchronization processing section $223A_0$ in this first modified example includes an all-one detection circuit 301 instead of the all-zero detection circuit 281 shown in FIG. 3. The all-one detection circuit 301 detects a condition where the zeroth to seventh synchronization bits 270-277, i.e. 8 bits in total, are being the signal "1". The all-one detection circuit 301 can be composed of such as an eight-input AND circuit.

The all-one detecting signal 302 is inputted into the inverter 283 which is a portion of the zeroth synchronization detection circuit 233$A_0$, and the inverter 283 of the first AND circuit, then its logic is inverted. Therefore, an output 285A of the inverter 283 becomes the signal "0" only when all of the zeroth to seventh synchronization bits 270-277 are being the signals "1". This output 285A is one of two inputs of the first AND circuit 284. The first AND circuit 284 outputs the signal "0" as the synchronization pattern detecting signal 286 which shows an asynchronous condition regardless of a logic state of the other input terminal, when all of the zeroth to seventh synchronization bits 270-277 becomes the signal "1".

Therefore, the second AND circuit 288 detects a bit string with 8 bits coincided with the zeroth synchronization pattern $221_0$, if it exists, in a condition where one frame of the zeroth signal $212_0$ is shifted from the zeroth to seventh flip-flop circuits 250-257 sequentially by 1 bit according to the clock $236_0$. In addition, if the zeroth synchronization pattern $221_0$ is composed of such as a bit string, "10111010", and there is the same bit string in the zeroth signal 212 composing a frame$_0$, the second AND circuit 288 outputs the pre-prohibition synchronization pattern detecting signal 289 to be the signal "1" at the detecting timing. In this example, the all-one detection circuit 301 does not detect an all-one state because the zeroth synchronization pattern $221_0$ is not with all "1". Therefore, the all-one detecting signal 302 is the signal "0", and the output 285 of the inverter 283 is the signal "1". Consequently, both of two inputs of the first AND circuit 284 become the signals "1", and the synchronization pattern detecting signal 286 becomes the signal "1". Thus, existence of the frame synchronization pattern in a corresponding frame is detected.

On the other hand, when the zeroth synchronization pattern $221_0$ is composed of such as an all-one bit string, "11111111", the all-one detecting signal 302 becomes the signal "1". Therefore, when the zeroth synchronization pattern $221_0$ has the all-one bit string, such as "11111111", the pre-prohibition synchronization pattern detecting signal 289 of the second AND circuit 288 becomes "1", and the output 285A of the inverter 283 inverts into "0". Consequently, the synchronization pattern detecting signal 286A as an output of the first AND circuit 284 becomes the signal "0" indicating the asynchronous state, and the synchronization is not detected.

According to the above described the second exemplary embodiment of the invention, a coincidence processing with a synchronization pattern can be prohibited when there is the all-one state in a frame due to a system error or the like. Therefore, the synchronization is prohibited from being pulled in when this pattern is coincided with a bit string in a frame, as in the case with the all-zero existence in the first exemplary embodiment. Consequently, the synchronization pull-in can be started immediately with respect to a normal synchronization pattern, which is not the all-one signal pattern, and a start-up time for a system can be minimized.

Third Exemplary Embodiment

An example in which a one-bit shift coincidence circuit 321 is used instead of the all-zero detection circuit 281 shown in FIG. 3 will be explained as a third exemplary embodiment with reference to FIG. 6. Identical portions between FIGS. 3 and 6 have the same reference numerals, and explanations therefor will be omitted accordingly.

Figure 6:
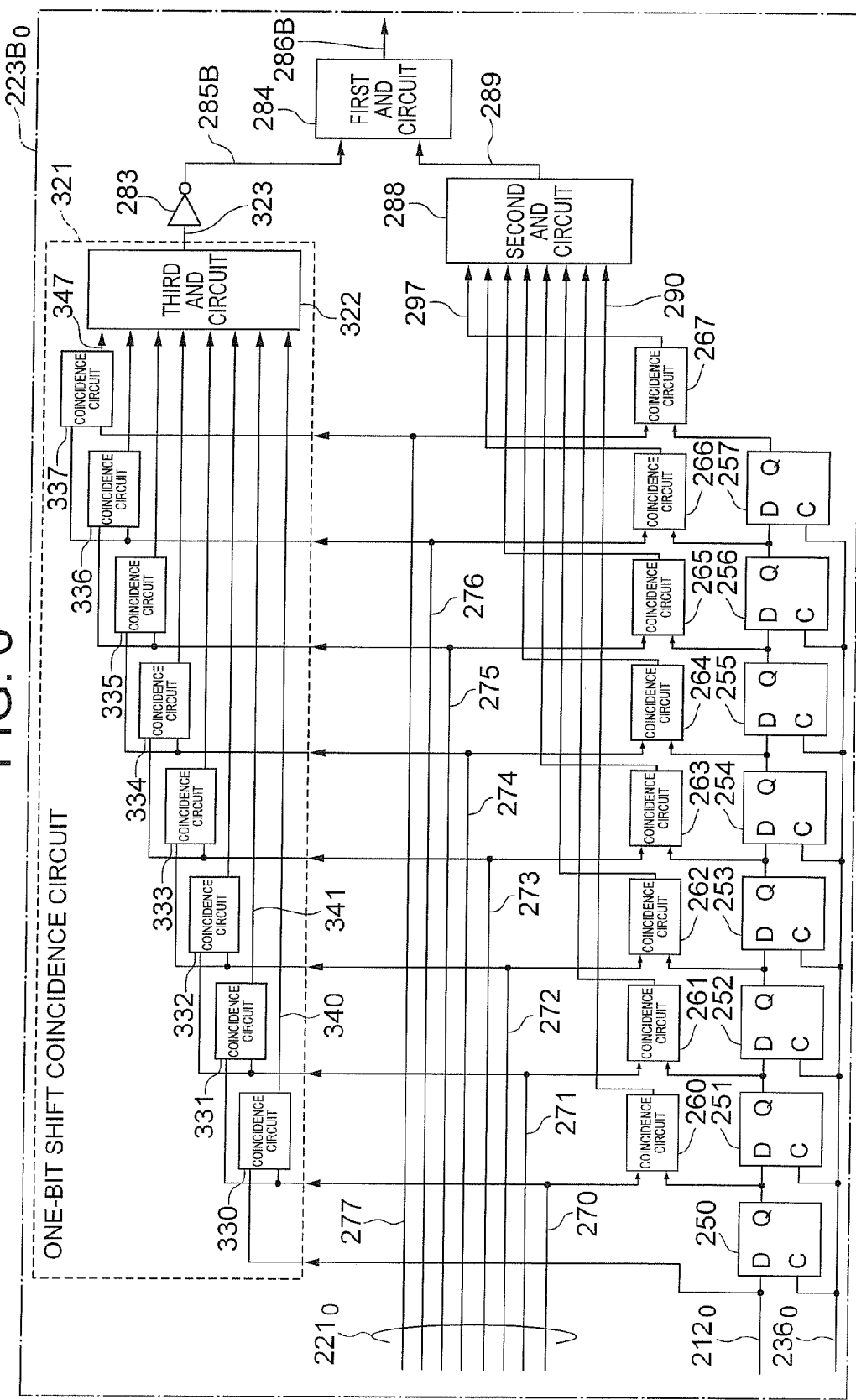
FIG. 6 is a block diagram showing a specific example of the synchronization processing unit in a third exemplary embodiment of the invention.

A zeroth synchronization processing unit $223B_0$ in the third exemplary embodiment of the invention shown in FIG. 6 includes the one-bit shift coincidence circuit 321 instead of the all-zero detection circuit 281 shown in FIG. 3. The one-bit shift coincidence circuit 321 is a circuit for comparing a synchronization pattern and a pattern shifted by one bit from the synchronization pattern to determine whether these are identical. It includes a zeroth to seventh coincidence circuits 330-337, and a third AND circuit 322 for logical product of the coincidence results 340-347.

The zeroth coincidence circuit 330 detects signal coincidence between the zeroth signal $212_0$ and the zeroth synchronization bit 270 composing the zeroth synchronization pattern $221_0$. The first coincidence circuit 331 detects the signal coincidence between the aforementioned zeroth synchronization bit 270 composing the zeroth synchronization pattern $221_0$ and the first synchronization bit 271. The second coincident circuit 332 detects the signal coincidence between the aforementioned first synchronization bit 271 composing the zeroth synchronization pattern $221_0$ and the second synchronization bit 272. The following processing progress in the same manner, and the seventh coincidence circuit 337 detects the signal coincidence between the sixth synchronization bit 276 composing the zeroth synchronization pattern $221_0$ and the seventh synchronization bit 277.

The third AND circuit 322 makes the one-bit shift coincidence detecting signal 323 be the signal "1" state when the zeroth to seventh coincidence circuits 330-337 detect the coincidences at the same time, and makes it be the signal "0" state in other cases. The one-bit shift coincidence detecting signal 323 has its logic inverted by the inverter 283, and a logical product of an output 285B thereof and the pre-prohibition synchronization pattern detecting signal 289 is obtained at the first AND circuit 284. The first AND circuit 284 outputs a synchronization pattern detecting signal 286B.

In the zeroth synchronization processing unit $233B_0$ in the third exemplary embodiment of the invention, the one-bit shift coincidence circuit 321 detects a condition where a fixed pattern is continued until one bit after a synchronization pattern, as in the case of a synchronization pattern where neighboring bits are in a same logic state, such as the all-zero or all-one state. Then, the coincidence processing with such a synchronization pattern can be prohibited. Therefore, the synchronization pull-in can be started immediately with respect to a normal pattern excluding a synchronization pattern which is detected by the one-bit shift coincidence circuit 321, and the start-up time for a system can be minimized.

Fourth Exemplary Embodiment

Figure 7:
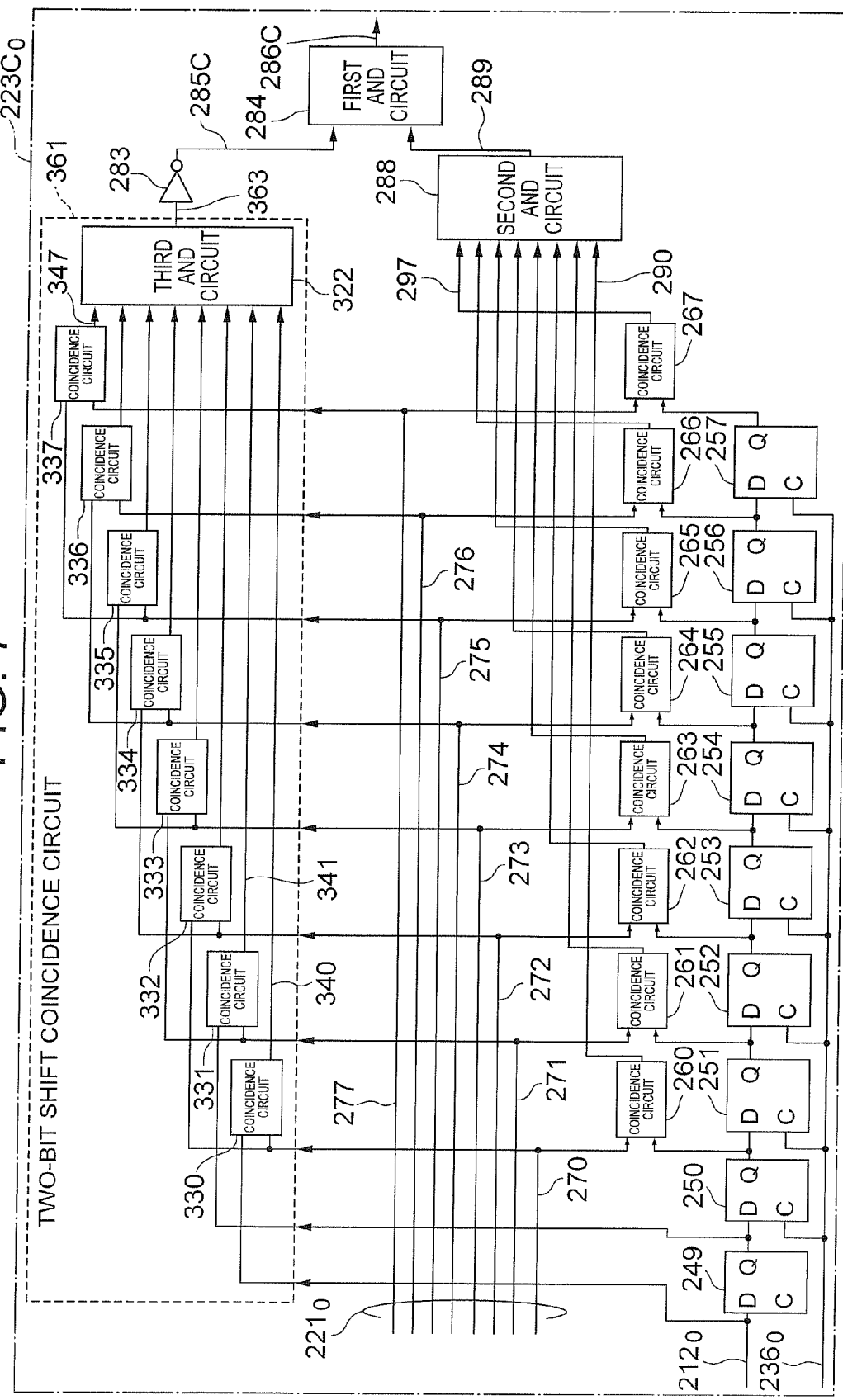
FIG. 7 is a block diagram showing a specific example of the zeroth synchronization processing unit in a fourth exemplary embodiment of the invention.

An example will be explained as a fourth exemplary embodiment with reference to FIG. 7, in which two-bit shift coincidence circuit is used instead of the one-bit shift coincidence circuit shown in FIG. 6. In FIG. 7, identical portions with FIGS. 3 and 6 have the same reference numerals, and explanations therefor will be omitted accordingly.

A synchronization processing unit $223C_0$ shown in the fourth exemplary embodiment of the present invention in FIG. 7 includes the two-bit shift coincidence circuit instead of the one-bit shift coincidence circuit shown in FIG. 6. The two-bit shift coincidence circuit 361 is a circuit for comparing a synchronization pattern and a pattern shifted by two bits from the synchronization pattern to determine whether these are identical. A circuit structure thereof is the same as the one-bit shift coincidence circuit 321 shown in FIG. 6 in terms of including the third AND circuit 322 for obtaining a logical product of the zeroth to seventh coincidence circuits 330-337 and coincidence results 340-347 thereof.

In the zeroth synchronization processing unit $223C_0$ in the fourth exemplary embodiment of the present invention, a shift register including a negative-first flip-flop circuit 249 connected in front of the zeroth flip-flop circuit 250 is used in addition to the zeroth to seventh flip-flop circuits 250-257. This is for comparing a synchronization pattern and a pattern shifted by 2 bits from the synchronization pattern to determine whether these are identical.

In this case, the zeroth coincidence circuit 330 detects signal coincidence between a signal at a data input terminal D of the negative-first flip-flop circuit 249 and the zeroth synchronization bit 270 composing the zeroth synchronization pattern $221_0$. The first coincidence circuit 331 detects signal coincidence between the zeroth signal $212_0$ which is inputted into the data input terminal D of the zeroth flip-flop circuit 250 being shifted by 1 bit from the zeroth signal $212_0$ according to the clock $236_0$ and the first synchronization bit 271 composing the zeroth synchronization pattern $221_0$. The second coincidence circuit 332 detects signal coincidence between the aforementioned zeroth synchronization bit 270 composing the zeroth synchronization pattern $221_0$ and the second synchronization bit 272. The third coincidence circuit 333 detects signal coincidence between the aforementioned first synchronization bit 271 composing the zeroth synchronization pattern $221_0$ and the third synchronization bit 273. Following processes progress as in the same manner, and the seventh coincidence circuit 337 detects signal coincidence between the fifth synchronization bit 275 composing the zeroth synchronization pattern $221_0$ and the seventh synchronization bit 277.

The third AND circuit 322 makes the two-bit shift coincidence detecting signal 363 be the signal "1" when all of the zeroth to seventh coincidence circuits 330-337 detect the coincidence at the same time, and makes it be the signal "0" in other cases. The two-bit shift coincidence detecting signal 363 has its logic inverted by the inverter 283, and a logical product of an output 285C thereof and the pre-prohibition synchronization pattern detecting signal 289 is obtained by the first AND circuit 284. The first AND circuit 284 outputs a synchronization pattern detecting signal 286C.

In the zeroth synchronization processing unit $233C_0$ in the fourth exemplary embodiment of the invention, a designated synchronization pattern can be detected when a signal logic state thereof is same at every other bit such as the all-zero pattern, the all-one bit pattern, and the like, in addition, a fixed pattern where "10" is repeated ("101010", "1010101", etc.), which cannot be detected by the second modified example, can be detected. Accordingly, coincidence processing with those synchronization patterns c coincidence an be prohibited. That is, synchronization pull-in can be started immediately with respect to a normal synchronization pattern excluding a synchronization pattern detected by the one-bit shift coincidence circuit 321 shown in FIG. 6, and a start-up time for a system can be minimized.

Further, it is possible that comparison of coincidence between a synchronization pattern and a pattern shifted by three bits from the synchronization pattern, although a drawing therefor is omitted. With this method, a condition can be confirmed where a fixed pattern continues three bits after a synchronization pattern, and a pattern which is not suitable definitely for a synchronization pattern can be excluded from the target of the synchronization. For example, when a width of a synchronization pattern is in multiples of three such as a case with "101101101", a fixed pattern with 3 bits repetition, which cannot be detected by the two-bit shift, can be detected.

As in the same manner, shifted bit quantity can be increased. Generally, when Code p is a positive integer, a repeating pattern in p bits unit can be detected by employing a p-bit shift structure. That is, a pattern likely to be generated in an abnormal condition is excluded from synchronization patterns so that synchronization pull-in can be started immediately with respect to a normal synchronization pattern, and a start-up time for a system can be minimized.

In the exemplary embodiments described above, when some specific synchronization patterns such as the all-zero detecting signal 282 appear, those synchronization pattern are always excluded from a target for the synchronization, however, a timing for enabling this prohibition function for the synchronization pattern detection to be effective may be set. For example, the prohibition function for synchronization pattern detection can be on/off depending on any of states; the non-synchronization state, a synchronization pull-in stage count state, a synchronization pull-in establishment state, or a non-synchronization stage count state. Further, in a normal transmission system, a condition where an abnormal pattern is generated continuously does not need to be considered in many cases after the synchronization is once pulled in. Therefore, in such a transmission system, the prohibition function for detecting a specific synchronization pattern may be off after the synchronization is pulled in. Further, in the non-synchronization state, it is also effective in many cases that the prohibition function for detecting at least a specific synchronization pattern is on.

Further, in the first exemplary embodiment or the second exemplary embodiment, one set of the prohibited and fixed pattern either in the all-zero state or the all-one state is prepared, however, a plurality of prohibited and fixed patterns may be a target for detection using the above detection circuits together.

Further, another exemplary embodiment of the invention will be explained. This exemplary embodiment of the present invention may include: a) a prohibited and fixed pattern setting unit for setting previously an arbitrary set of bit patterns having a bit length with two or more bits as a prohibited and fixed pattern, b) a frame synchronization pattern receiving unit for receiving a bit pattern having the aforementioned bit length as a frame synchronization pattern sequentially and exchanging content thereof for a newly received frame synchronization pattern sequentially, c) a frame synchronization pattern matching unit for receiving a signal sequentially in frames and determining whether a bit serial pattern composing each frame includes a same bit string as the frame synchronization pattern received and renewed by the frame synchronization pattern receiving unit, d) a frame synchronization detecting unit for detecting a corresponding frame synchronization according to a frame synchronization pattern targeted for the matching to be determined that it includes the same bit string in the frame synchronization pattern matching unit, and the frame synchronization pattern is not coincided with any prohibited and fixed pattern set by the prohibited and fixed pattern setting unit.

Namely, according to this exemplary embodiment of the present invention, one or two sets of the prohibited and fixed pattern are registered in the prohibited and fixed pattern storing unit, and a frame synchronization pattern is received and content thereof is renewed sequentially. When it is identified with the prohibited and fixed pattern, it is not used as a frame synchronization pattern to check the frame synchronization. The prohibited and fixed pattern is such as the all-zero bit pattern and the all-one bit pattern, which are likely to appear in a system with an abnormal condition. Therefore, according to this exemplary embodiment of the present invention, an unsuitable frame synchronization pattern for frame synchronization check can be excluded when the synchronization is checked, which can prevent a receiving device from a malfunction of the synchronization processing.

Another exemplary embodiment of the present invention may include: a) a frame synchronization pattern receiving unit for receiving sequentially a bit pattern having a bit length with two or more bits as a frame synchronization pattern and exchanging content thereof for a newly received frame synchronization pattern continuously, b) a frame synchronization pattern matching unit for receiving a signal sequentially in frames and determining whether a bit serial pattern composing each frame includes a same bit string as the frame synchronization pattern received and renewed by the frame synchronization pattern receiving unit, c) a prohibition matching unit for determining whether one bit composing the frame synchronization pattern targeted for matching when it is determined by the frame synchronization pattern matching unit that it includes the same bit string and a bit in a pattern shifted by a prescribed bit length from the above pattern are coincident with each other, and d) a frame synchronization detecting unit for detecting corresponding frame synchronization according to the determination by the prohibition matching unit in which not all the patterns are determined to be coincident when the frame synchronization pattern matching unit determines the same bit string is included.

Namely, according to this embodiment of the present invention, the prohibition matching unit for determining whether one bit composing a frame synchronization pattern targeted for the matching and a bit in a pattern shifted by a prescribed bit length from the aforementioned pattern are coincident is provided. Even if the frame synchronization pattern matching unit determines that the frame synchronization is established, the frame synchronization is not finally established when the prohibition matching unit provides a coincident state in its matching result. Accordingly, a malfunction for synchronizing a frame in a system with an abnormal state is eliminated, and a malfunction of the synchronization processing in a receiving device is prevented.

The synchronization may be established only when the frame synchronization is continuously confirmed in a prescribed number of times, or, after the synchronization is established, the non-synchronization may be determined when the frame synchronization is not detected continuously in a prescribed number of times. Accordingly, system stability can be increased.

A frame synchronization method according to another embodiment may include the steps of: a) receiving a bit pattern having a bit length with two or more bits sequentially as a frame synchronization pattern and exchanging sequentially content thereof for a newly received frame synchronization pattern, b) receiving a signal sequentially in frames and determining whether a bit serial pattern composing each frame includes a same bit string as the frame synchronization pattern received and renewed in the frame synchronization pattern step, c) determining whether the frame synchronization pattern targeted for the matching is not coincided with any aforementioned arbitrary set of prohibited and fixed patterns having a bit length with two or more bits when it is determined in the frame synchronization pattern matching step that it includes the same bit string, and d) detecting a corresponding frame synchronization when any prohibited and fixed pattern is not coincided with the frame synchronization pattern in the prohibited and fixed pattern matching non-detecting step.

A frame synchronization method according to another exemplary embodiment of the present invention may include the steps of: a) receiving a bit pattern having a bit length with two or more bits as a frame synchronization pattern sequentially and exchanging content thereof for a newly received frame synchronization pattern continuously, b) receiving a signal sequentially in frames and determining whether a bit serial pattern composing each frame includes a same bit string as the frame synchronization pattern received and renewed in the frame synchronization pattern receiving step, c) determining whether one bit composing the frame synchronization pattern targeted for the matching coincides a bit in a pattern shifted by a prescribed bit length from the frame synchronization pattern when it is determined in the frame synchronization pattern matching step that it includes the same bit string, and d) detecting corresponding frame synchronization according to the determination in the prohibition matching step in which not all the patterns are determined to be coincident when it is determined in the frame synchronization pattern matching step that the same bit string is included.

As described above, synchronization pull-in is prohibited with respect to a specific frame synchronization pattern, which leads to preventing erroneous synchronization with an abnormal frame synchronization pattern when a system is not stable such as at a system start-up. Consequently, synchronization can be pulled in sooner when a normal frame synchronization pattern is received.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A communication system in which a transmitting device sends a frame-structured signal to a receiving device and the receiving device recognizes a frame synchronization pattern and performs a synchronous detection of a frame, so as to establish synchronization, wherein:
   the receiving device includes a frame synchronization device for comparing a frame synchronization pattern for synchronous detection based on a correction signal for correcting a phase shift of the frame-structured signal so as to establish the synchronization,
   the frame synchronization device prevents synchronization establishment while a frame synchronization pattern for preventing synchronization establishment state and a frame pattern of the frame-structured signal are coincident, and
   the frame synchronization device detects pattern coincidence by shifting a frame pattern of the frame-structured signal and the frame synchronization pattern for preventing synchronization establishment;
   wherein the frame synchronization pattern for synchronous detection is different from the frame synchronization pattern for preventing synchronization establishment state.

2. A control device receiving a frame-structured signal sent by a transmitting device and performing a synchronous detection of a frame by recognizing a frame synchronization pattern so as to control synchronization establishment, the control device comprising:
   a frame synchronization device for establishing synchronization by comparing a frame synchronization pattern for synchronous detection based on a correction signal for correcting a phase shift of the frame-structured signal,
   wherein:
   the frame synchronization device prevents synchronization establishment while a frame synchronization pattern for preventing synchronization establishment state and a frame pattern of the frame-structured signal are coincident, the frame synchronization device detects pattern coincidence by shifting a frame pattern of the frame-structured signal and the frame synchronization pattern for preventing synchronization establishment, and the frame synchronization pattern for synchronous detection is different from the frame synchronization pattern for preventing synchronization establishment state.

3. A communication method for transmitting a frame-structured signal by a transmitting device to a receiving device and recognizing a frame synchronization pattern and performing a synchronous detection of a frame by the receiving device, so as to establish synchronization, the communication method comprising:

establishing the synchronization by comparing a frame synchronization pattern for synchronous detection based on a correction signal for correcting a phase shift of the frame structured signal; and preventing synchronization establishment while a synchronization pattern for preventing synchronization established state and a frame pattern of the frame-structured signal are coincident, wherein pattern coincidence is detected by shifting a frame pattern of the frame-structured signal and the frame synchronization pattern for preventing synchronization establishment, the frame synchronization pattern for synchronous detection is different from the frame synchronization pattern for preventing synchronization establishment state.

\* \* \* \* \*